United States Patent [19]

Hirooka et al.

[11] 3,957,732
[45] May 18, 1976

[54] ALTERNATING COPOLYMERS HAVING FUNCTIONAL GROUP AND PROCESS FOR PRODUCING SAME

[75] Inventors: Masaaki Hirooka; Yoshikazu Fujii, both of Ibaragi; Kentaro Mashita, Takatsuki; Fumiyuki Kimura, Settsu, all of Japan

[73] Assignee: Sumitomo Chemical Company, Limited, Osaka, Japan

[22] Filed: Jan. 29, 1974

[21] Appl. No.: 437,631

[30] Foreign Application Priority Data

Feb. 2, 1973   Japan................................ 48-13995

[52] U.S. Cl. .................................. 526/90; 526/186; 526/196; 526/219; 526/227; 526/258; 526/272; 526/295; 526/338; 526/339; 526/350
[51] Int. Cl.² ................. C08F 222/06; C08F 222/24
[58] Field of Search .................. 260/78.5 R, 78.5 E, 260/80.8, 80.81

[56] References Cited
UNITED STATES PATENTS

| | | | |
|---|---|---|---|
| 3,700,648 | 10/1972 | Hirooka et al. ................... | 260/63 R |
| 3,717,613 | 2/1973 | Ichikawa et al. .................. | 260/63 R |
| 3,753,959 | 8/1973 | Ichikawa et al. ............. | 260/78.5 BB |
| 3,793,262 | 2/1974 | Logothetis ......................... | 260/86.7 |

OTHER PUBLICATIONS

U.S. Published Patent Application, B233,741, Logothetis, 1/28/75, filed 4/71.

*Primary Examiner*—John Kight, III
*Attorney, Agent, or Firm*—Stevens, Davis, Miller & Mosher

[57] ABSTRACT

Novel alternating copolymers having functional groups are prepared by subjecting to alternating copolymerization at least one olefin, at least one acrylic ester and at least one α,β-ethylenically unsaturated dicarboxylic acid or its derivative represented by the formula:

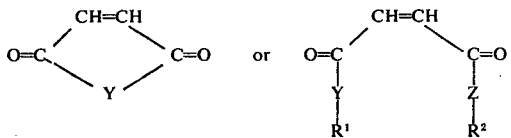

wherein Y and Z are independently —O—, —S—, or —NR³—, and R¹, R² and R³ are independently hydrogen or hydrocarbon groups having 1 to 20 carbon atoms. Said alternating copolymer consists essentially of a structure in which said olefin is bonded to only said acrylic ester or said α,β-ethylenically unsaturated dicarboxylic acid or its derivative, and said acrylic ester and said α,β-ethylenically unsaturated dicarboxylic acid or its derivative are bonded to only said olefin, and has a sufficiently high molecular weight.

21 Claims, No Drawings

ALTERNATING COPOLYMERS HAVING FUNCTIONAL GROUP AND PROCESS FOR PRODUCING SAME

This invention relates to an alternating copolymer in which olefin is alternately bonded to acrylic ester or α,β-ethylenically unsaturated dicarboxylic acid or its derivative, and to a process for producing said alternating copolymer.

It has been considered that high polymers containing α,β-ethylenically unsaturated dicarboxylic acid or its derivative, particularly maleic anhydride, might be, as such, used as functional polymers in various fields owing to their high reactivity, or said high polymers can be first converted into high polymers having various specific functions by reacting the carboxyl groups in the side chain with compounds reactive therewith and then used as functional polymers in various fields. However, said α,β-ethylenically unsaturated dicarboxylic acids themselves are greatly inferior in polymerizability or have no polymerizability, and hence, it has only been known that said α,β-ethylenically unsaturated dicarboxylic acids can be introduced into high polymers by grafting or can be copolymerized with special monomers, and it has been impossible to introduce at will said α,β-ethylenically unsaturated dicarboxylic acids into high polymers having any desired structures.

On the other hand, it has been difficult to produce satisfactory copolymers from acrylic esters and olefins. This is because in the case of radical polymerization system, olefins act as degradative chain transfer agent, thereby greatly reducing the molecular weight and at the same time greatly lowering the copolymerization rate. In addition, the olefin content in the thus obtained copolymer is not so high even when the olefin is used in a considerably large amount. Our research group has, however, succeeded in obtaining high molecular weight olefin-acrylic ester copolymers, particularly high molecular weight alternating olefin-acrylic ester copolymers, by using metal halides, such as alkylaluminum halides, as catalysts, as disclosed in, for example, British Pat. No. 1,089,279. However, maleic anhydride has not been able to copolymerize satisfactorily with olefins even using alkylaluminum halides. Therefore, said patent does not include said combination of monomers in its claim. The inventors, however, have recently surprisingly found that satisfactory alternating copolymers can be produced from a system comprising an olefin, an acrylic ester and an α,β-ethylenically unsaturated dicarboxylic acid or its derivative.

Furthermore, the inventors have found that the resulting alternating copolymers are not such low molecular weight polymers as often seen in conventional maleic anhydride-containing systems, but high molecular weight polymers having sufficiently practical values.

An object of this invention is to provide novel alternating copolymers.

A further object of this invention is to provide an alternating copolymer comprising an olefin, an acrylic ester and an α,β-ethylenically unsaturated dicarboxylic acid or its derivative and having a high molecular weight.

A still further object of this invention is to provide a process for producing the above novel alternating copolymers.

Other objects and advantages of this invention will become apparent from the following description.

According to this invention, there is provided an alternating copolymer having functional groups obtained by copolymerizing at least one olefin, at least one acrylic ester and at least one α,β-ethylenically unsaturated dicarboxylic acid or its derivative represented by the formula:

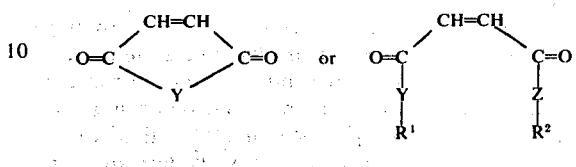

wherein Y and Z are independently —O—, —S— or —NR$^3$—, and R$^1$, R$^2$ and R$^3$ are independently hydrogen or hydrocarbon groups having 1 to 20 carbon atoms, and a process for producing the same.

The olefins used in this invention include all olefin compounds copolymerizable with acrylic esters, particularly olefinic hydrocarbon compounds having 2 to 20 carbon atoms and halogen-substituted olefinic hydrocarbon compounds having 2 to 20 carbon atoms. Among them terminally unsaturated olefins, particularly isoolefins are preferable, and aliphatic olefins are especially useful. Further, internal olefins copolymerizable with acrylic esters may, if necessary, be used. Among halogen-substituted olefins, there are preferable compounds having halogen atoms bonded not directly to the double bonds. As these olefins, there may be exemplified, for instance, isobutylene, propylene, ethylene, butene-1, 2-methylbutene-1, 2-methylpentene-1, hexene-1, butene-2, 4-methylpentene-1, β-methallyl chloride, 2-methyl-4-chloropentene-1, 2-methyl-4-phenylbutene-1, octadecene-1 and the like. Among these compounds, isobutylene and propylene are particularly important. These olefin compounds belong to the [A] group monomers which will be mentioned hereinafter.

The acrylic esters copolymerized with the olefins may have any alcohol moiety, though the alcohol moiety is preferably a hydrocarbon or halohydrocarbon group having 1 to 20 carbon atoms. The alcohol moiety includes, for instance, alkyl, aryl, aralkyl, alkylaryl, cycloalkyl, alkenyl, aralkenyl, alkenylaryl, cycloalkenyl and the like and their halogen-substituted groups.

Concrete examples of the acrylic esters include methyl acrylate, ethyl acrylate, propyl acrylate, n-butyl acrylate, t-butyl acrylate, n-amyl acrylate, n-hexyl acrylate, 2-ethylhexyl acrylate, octadecyl acrylate, o-tolyl acrylate, benzyl acrylate, cyclohexyl acrylate, 2-chloroethyl acrylate, vinyl acrylate, allyl acrylate, isobutenyl acrylate, 1'-butenyl acrylate, crotyl acrylate, 2'-butenyl acrylate, cinnamyl acrylate, 3'-cyclopentenyl acrylate, citronellyl acrylate, geranyl acrylate, 5'-norbornene-2'-yl-methyl acrylate, chloroallyl acrylate and the like.

The α,β-ethlenically unsaturated dicarboxylic acid or its derivative to be copolymerized is a compound represented by the above-mentioned formulas and includes maleic acid, fumaric acid and their derivatives. Concrete examples of the compound include, for instance, maleic acid, fumaric acid, maleic anhydride, maleimide, N-methylmaleimide, N-2-ethylhexylmaleimide, maleic monoamide, N-methyl maleic monoamide, N,N-dimethyl maleic monoamide, maleic diamide, N,N'-dimethylmaleic diamide, monomethyl maleate, mono-n-butyl maleate, mono-2-ethylhexyl maleate, monomethyl thiolmaleate, dimethyl maleate, diethyl maleate, di-n-butyl maleate, di-2-ethylhexyl maleate, dioctadecyl maleate, dimethyl thiolmaleate, diethyl fumarate, di-2-chloroethyl thiolfumarate, and the like. Among these compounds, maleic anhydride is particularly useful.

The acrylic esters and the α,β-ethylenically unsaturated dicarboxylic acids and their derivatives belong to the [B] group monomers which will be mentioned hereinafter.

The copolymer of this invention is an alternating olefin-acrylic ester-α,β-ethylenically unsaturated dicarboxylic acid or its derivative interpolymer consisting essentially of a structure in which the olefin is alternately bonded to the acrylic ester and the α,β-ethylenically unsaturated dicarboxylic acid or its derivative. In other words, in the above alternating interpolymer, the olefin is bonded substantially solely to the acrylic ester and the α,β-ethylenically unsaturated dicarboxylic acid or its derivative, while the acrylic ester and the α,β-ethylenically unsaturated dicarboxylic acid or its derivative are bonded substantially solely to the olefin. Therefore, in the alternating interpolymer, the proportion of the olefin is about 50 mole percent and the total amount of the acrylic ester and the α,β-ethylenically unsaturated dicarboxylic acid or its derivative is about 50 mole percent, and the proportion of the acrylic ester to the α,β-ethylenically unsaturated dicarboxylic acid or its derivative may be any value. For example, when the proportion of the acrylic ester is 0.1 to 49.9 mole percent, the alternating interpolymer becomes to contain 0.1 to 49.9 mole percent of the α,β-ethylenically unsaturated dicarboxylic acid or its derivative and about 50 mole percent of the olefin. In particular, alternating interpolymers containing 2 to 49 mole percent, particularly 20 to 45 mole percent, of the acrylic ester are preferably used.

The alternating copolymer of this invention comprises the olefin and the acrylic ester as the major components, and may comprise other ethylenically unsaturated compound in the form of a multi-component copolymer, thereby improving the polymer characteristics. Said other ethylenically unsaturated compound includes various monomers belonging to the [A] and [B] groups effective to produce alternating copolymers. As the monomers, there are preferable those disclosed in, for instance, British Pat. No. 1,187,105 and U.S. Pat. Nos. 3,700,648 and 3,692,754. That is to say, preferable monomers are styrene and its homologs, diene compounds, and unsaturated esters of carboxylic acids and unsaturated ethers, which all belong to the [A] group, and acrylonitrile, acrylic acid, acryloyl halides and acrylamides, which all belong to the [B] group. In these alternating copolymers, the monomer or monomers belonging to the [A] group are substantially alternately bonded to the monomers belonging to the [B] group. These optional units are preferably used in an amount of less than 30 mole % in the copolymers.

According to the process of this invention, the olefin, the acrylic ester and the α,β-ethylenically unsaturated dicarboxylic acid or its derivative are subjected to alternating copolymerization with a Lewis acid such as a halogen-containing compound of aluminum, boron, zinc and tin as a complexing agent. The method of the alternating copolymerization is described in detail in, for instance, British Pat. No. 1,187,105 and U.S. Pat. No. 3,700,648. That is to say, said catalyst forms a complex with the carbonyl group of the acrylic ester or the α,β-ethylenically unsaturated dicarboxylic acid or its derivative, and at the same time, the organoaluminum halide or organoboron halide acts as initiator, thereby producing effectively an alternating copolymer. Particularly preferable catalysts are organoaluminum halides, organoboron halides or systems containing components corresponding to these compounds. That is, a compound having the formula:

$$MR_nX_{3-n}$$

wherein M is aluminum or boron, R is a hydrocarbon group having 1 to 20 carbon atoms, X is a halogen atom and n is any value greater than zero and less than 3, preferably 1, 1.5 or 2, is a preferable catalyst. As the compound, preferable are alkylaluminum dihalides, alkylaluminum sesquihalides, dialkylaluminum halides, alkylboron dihalides, dialkylboron halides, and the like. In particular, alkylaluminum sesquihalides and alkylboron halides are effective. Ethylaluminum sesquichloride and ethylboron dichloride are representative thereof.

In the process of this invention, there is also effectively used a system comprising an organometallic compound of metal of Group IIb, IIIb or IVb of Mendeleev's Periodic Table and a metal halide of metal of Group IIb, IIIb and IVb of Mendeleev's Periodic Table. As the organocompound of metal of Group IIb, IIIb or IVb of Mendeleev's Periodic Table, preferable are compounds represented by the formula:

$$M'R'_lX'_{p-l}$$

wherein M' is a metal of Group IIb, IIIb or IVb of Mendeleev's Period Table, R' is a hydrocarbon group having 1 to 20 carbon atoms, X' is a halogen atom, p is the valency of the metal and l is any value of from 1 to p, and as the halide of a metal of Group IIb, IIIb or IVb of Mendeleev's Periodic Table, preferable are compounds represented by the formula:

$$M''X''_mR''_{q-m}$$

wherein M'' is a metal of Group IIb, IIIb or IVb of Mendeleev's Periodic Table, R'' is a hydrocarbon group having 1 to 20 carbon atoms, X'' is a halogen atom, q is the valency of the metal and m is any value of from 1 to q.

These metal elements include zinc, cadmium, mercury, boron, aluminum, gallium, indium, thallium, germanium, tin, lead and the like. In particular, zinc, boron, aluminum and tin compounds are effective. Of these compounds, important are diethylzinc, triethylboron, tributylboron, triethylaluminum, tributylaluminum, trihexylaluminum, tetraethyltin, tetraphenyltin, ethyllead chloride, diethylboron chloride, ethylboron dichloride, ethylaluminum dichloride, ethylaluminum sesquichloride, triethyltin chloride, ethyltin trichloride, zinc chloride, boron trichloride, boron trifluoride, aluminum chloride, aluminum bromide, tin tetrachloride and the like. In order to selectively obtain an alternating copolymer by use of said compounds, it is important that the organometallic compound and the metal halide are mixed with each other in the presence of the conjugated vinyl compound which is a [B] group monomer and that at least one of said compounds is of aluminum or boron. For example, when triethylaluminum is previously reacted with tin tetrachloride, the resulting reaction product acts as a Lewis acid catalyst to accelerate only cation polymerization of the [A] group monomer. However, when triethylaluminum is contacted with tin tetrachloride in the presence of the [B] group monomer, the resulting product acts as copolymerization catalyst. When both the compounds are of aluminum or boron, however, the two may be previously reacted with each other in the absence of the [B] group monomer.

The polymerization can be accelerated by adding to the catalyst system containing the above aluminum or boron compound a compound of a transition metal of Group IVa, Va, VIa, VIIa or VIII of Mendeleev's Periodic Table. This transition metal compound is preferable to be added to the catalyst system in the presence of the [B] group monomer. As the transition metal compound, there may be used compounds having at least one member selected from the group consisting of halogens, alkoxy, $\beta$-diketone and acyloxy groups. As the $\beta$-diketone group, acylacetonyl, particularly acetylacetonyl, is preferable. As the metal of Group IVa, Va, VIa, VIIa or VIII of Mendeleev's Periodic Table, there may be exemplified titanium, zirconium, vanadium, chromium, molybdenum, tungsten, manganese, iron, cobalt, nickel, palladium, rhodium, platinum and the like. Among them, titanium, vanadium, chromium, iron, cobalt and nickel are preferable, and vanadium and cobalt are particularly preferable.

Main examples of these compounds are titanium tetrachloride, diethoxytitanium dichloride, n-butyl ortho-titanate, dicyclopentadienyltitanium dichloride, vanadium tetrachloride, vanadium trichloride, triethyl ortho-vanadate, vanadylethoxy dichloride, vanadium trisacetylacetonate, vanadylacetylacetonate dichloride, chromium trichloride, chromyl chloride, chromium trisacetylacetonate, cobalt acetylacetonate, cobalt chloride, cobalt naphthenate, nickel chloride, nickel stearate and the like. A preferable system is, for example, a combination of ethylaluminum sesquichloride-vanadyl trichloride, ethylboron dichloride-cobalt trisacetylacetonate, or the like.

The polymerization activity of the catalyst system using at least one aluminum or boron compound used in this invention can be enhanced by adding oxygen or an organic peroxide, or adding other radical initiator, for instance, an azo compound under some conditions. However, the addition of an excess of said compound inhibits, in some cases, the polymerization, and hence, when the said compound is added in a smaller amount than the above catalyst components, a good result is obtained. Oxygen acts effectively even when added in a considerably slight amount.

The above organic peroxide includes all organic compounds having peroxide bond, and there may be exemplified, for example, diacyl peroxide, ketone peroxide, aldehyde peroxide, ether peroxide, hydroperoxide, dihydrocarbyl peroxide, peracid ester, dihydrocarbyl percarbonate, percarbamate and the like. Particularly important organic peroxides are benzoyl peroxide, lauroyl peroxide, acetyl peroxide, methyl ethyl ketone peroxide, t-butyl hydroperoxide, cumene hydroperoxide, di-t-butyl peroxide and the like. In general, organic peroxides having a high decomposition rate are effective.

The aluminum or boron compound is preferably used in an amount of 0.0005 to 10 moles, particularly 0.005 to 1 mole per mole of the [B] group monomer consisting of the acrylic ester, the $\alpha,\beta$-ethylenically unsaturated dicarboxylic acid or its derivative and optionally other conjugated vinyl compounds. In particular, alkylboron halides are excellent in that a small amount thereof exhibits a sufficiently large polymerization activity. On the other hand, in order to maintain a sufficient alternating regulation, it is effective to use the metal halide component in a relatively large amount, for instance, an amount substantially equimolar to that of the [B] group monomer. With the system containing the transition metal compound, the transition metal compound is used in an amount of 0.001 to 10 moles, particularly 0.1 to 1 mole, per mole of the aluminum or boron compound.

The radical initiator, such as oxygen or the organic peroxide, may be used in any amount, though it is often used in an amount of 0.01 to 100 mole percent, particularly 0.1 to 20 mole percent or so, of the catalyst components. The proportion of the radical initiator to the [B] group monomer is preferably 0.001 to 20 mole percent, particularly preferably 0.01 to 5 mole percent.

In this invention, the copolymerization reaction may be effected in any manner, though the composition of the product may, in some cases, become uneven with a system having a large difference in reactivity between the monomers to be copolymerized. In the case of such a system, it is effective that the monomers and/or the catalyst components are continuously or successively added to effect the polymerization semicontinuously or continuously.

The copolymerization proceeds easily, in general, under atmospheric pressure, though it can be effected under pressure, such as up to 100 kg/cm².

In the process of this invention, the polymerization temperature may be any temperature of from $-150°C$ to $+120°C$, though $-80°$ to $+100°C$ is generally preferable and $-50°$ to $+50°C$ is particularly preferable.

In carrying out the process of this invention, bulk polymerization may be effected in liquid monomers, or an inert solvent may be used. As the inert solvent, there may be exemplified hydrocarbons and halogen-containing hydrocarbons. Examples of the solvent are propane, butane, pentane, hexane, heptane, octane, ligroin, petroleum ether, other petroleum mixed solvents, benzene, toluene, xylene, cyclohexane, methylcyclohexane, methylene dichloride, ethylene dichloride, trichloroethylene, tetrachlorethylene, butyl chloride, chlorobenzene, bromobenzene and the like. Compounds capable of forming a stable complex with the catalyst component are not desired as solvent.

After the completion of the polymerization reaction, the polymerization product is purified and recovered. Further, the catalyst components in the resulting copolymer may be separated and recovered from the copolymer by adding a compound capable of forming a complex with the catalyst components without decomposing the same.

This invention is further explained in detail below referring to Examples, which are not by way of limitation but by way of illustration.

EXAMPLE 1

Into a 50-ml glass tube were charged under a nitrogen atmosphere at $-78°C$ 100 millimoles of isobutylene and then 14.2 ml of toluene. Maintaining the temperature of the glass tube at 0°C, 5 millimoles of t-butylperoxypivalate (1 mole/liter toluene solution) was added to the glass tube, after which 45 millimoles of methyl acrylate, 5 millimoles of maleic anhydride and 5 ml of a solution of 2 millimoles of ethylaluminum sesquichloride in toluene were charged into the glass tube and the resulting mixture was subjected to reaction for 3 hrs. The contents of the glass tube were then poured into methanol, and the resulting precipitates were dried to obtain 6.3 g of a copolymer. The infrared absorption spectrum of the copolymer indicated a clear absorption based on the acid anhydride at 1855 cm$^{-1}$ and 1785 cm$^{-1}$, remarkable absorption based on methyl acrylate at 1735 cm$^{-1}$ and remarkable absorption based on isobutylene at 1390 cm$^{1}$ and 1370 cm$^{-1}$. This proves that the copolymer is an isobutylene-methyl acrylate-maleic anhydride terpolymer.

EXAMPLE 2

Into a 2-liter, glass, separable flask was charged 1,330 cc of toluene under a nitrogen atmosphere, and then 4 moles of isobutylene was charged thereinto at −20° C, during which nitrogen containing 1,9 % by volume of oxygen was introduced into the glass flask to replace the air in the glass flask with said nitrogen containing oxygen. A solution in toluene of 0.04 mole of ethylboron dichloride and 0.04 mole of diethylboron chloride (2 moles/liter) was then added to the glass flask, into which a mixture of 1.8 moles of methyl acrylate and 0.2 mole of maleic anhydride was dropped while maintaining the reaction temperature at −20°C, and the resulting mixture was subjected to reaction for 5 hrs. The infrared absorption spectrum of the resulting copolymer indicated a clear absorption based on the acid anhydride at 1855 cm$^{-1}$ and 1785 cm$^{-1}$. The yield of the copolymer was 280 g.

Determining the viscosity of a toluene solution of said copolymer at 30°C, it was found that the intrinsic viscosity of the copolymer was 2.28 dl/g. From the intensity ratio of the absorption based on the maleic anhydride at 1785 cm$^{-1}$ to the absorption based on methyl acrylate at 1735 cm$^{-1}$ in the infrared absorption spectrum and the analytical value of carbon, it was found that the composition of the copolymer was 50.8 mole percent of isobutylene, 44.7 mole percent of methyl acrylate and 4.5 mole percent of maleic anhydride.

EXAMPLE 3

Into 2-liter, glass, separable flask was charged under a nitrogen atmosphere 1,330 cc of toluene, and then 4 moles of isobutylene was added thereto at −20°C, after which 0.16 mole of ethylboron dichloride (2 moles/liter toluene solution) was added to the flask, and a mixture of 1.8 moles of ethyl acrylate and 0.2 mole of diethyl maleate was then added while maintaining the reaction temperature at −20°C. The resulting mixture was subjected to reaction for 6 hrs. to obtain 320 g of a copolymer having an intrinsic viscosity of 3.06 dl/g as measured at 30°C in toluene. The composition of the copolymer was 49.6 mole percent of isobutylene, 46.1 mole percent of ethyl acrylate and 4.3 mole percent of diethyl maleate.

EXAMPLE 4

Into 2-liter, glass, separable flask was charged under a nitrogen atmosphere 1,330 cc of toluene, and 4 moles of propylene was added thereto at −78°C, after which 0.04 mole of boron trichloride and 0.04 mole of triethylboron in 40 cc to toluene was charged into the flask. A mixture of 1.8 moles of n-butyl acrylate and 0.2 mole of maleic anhydride was added to the flask while maintaining the reaction temperature at −40°C, and the resulting mixture was subjected to reaction for 5 hrs. to obtain 325 g of a copolymer. From the infrared absorption spectrum of the copolymer and the analytical value of carbon, it was found that the composition of the copolymer was 50.6 mole percent of propylene, 45.1 mole percent of n-butyl acrylate and 4.3 mole percent of maleic anhydride.

EXAMPLE 5

Into 2-liter, glass, separable flask was charged under a nitrogen atmosphere 1,330 cc of toluene, and 4 moles of isobutylene was then added thereto at −20°C, during which nitrogen containing 2.0 % by volume of oxygen was introduced into the flask to be saturated. A mixture of 0.04 mole of ethylboron dichloride and 0.04 mole of diethylboron chloride (2 moles/liter toluene solution) was added to the flask, and while maintaining the reaction temperature at −20°C, a mixture of 1.8 moles of methyl acrylate, 0.2 mole of maleic anhydride and 0.2 mole of acryloyl chloride was dropped into the flask, and the resulting mixture was subjected to reaction for 5 hrs. to obtain a copolymer having an intrinsic viscosity of 2.73 dl/g as measured in toluene at 30°C. The infrared absorption spectrum of the copolymer indicated an absorption based on the acid anhydride at 1855 cm$^{-1}$ and a deep absorption based on the acid anhydride and the acid chloride at 1785 cm$^{-1}$. As a result of chlorine analysis of the resulting copolymer solution and gas-chromatographic analysis of the solution, it was found that 99.3 % of the acryloyl chloride charged was polymerized. Therefore, it follows that the above polymerization produces an isobutylene-methyl acrylate-maleic anhydride-acryloyl chloride quadripolymer.

EXAMPLE 6

Into 10-liter, glass, separable flask was charged, under an atmosphere of introgen containing 2 mole percent of oxygen, 4.8 liter of toluene, and 30 moles of isobutylene was added thereto at −20°C. Then, a mixture of 0.3 mole of ethylboron dichloride and 0.3 mole of diethylboron chloride as 3 moles/liter toluene solution was added to the flask, and while maintaining the reaction temperature at 0°C, a mixture of 13.5 moles of methyl acrylate, 1.5 moles of maleic anhydride and 1.5 moles of styrene was added to be reacted for 5 hours. The copolymer having the composition of 45 mole percent of isobutylene, 5 mole percent of styrene, 45 mole percent of methyl acrylate and 5 mole percent of maleic anhydride was substantially quantitatively obtained.

What is claimed is:

1. An alternating copolymer having functional groups obtained by copolymerizing at least one olefin selected from the group consisting of isobutylene, propylene, butene-1, 2-methylbutene-1, 2-methyl-pentene-1, hexene-1, butene-2, 4-methylpentene-1, β-methallylchloride, 2-methyl-4-chloropentene-1, 2-methyl-4-phenylbutene-1 and octadecene-1, at least one acrylic ester and at least one α,β-ethylenically unsaturated dicarboxylic acid or its derivative represented by the formula:

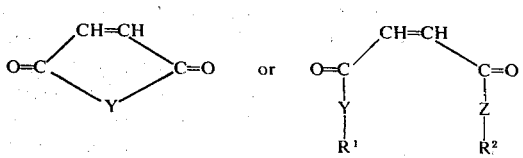

wherein Y and Z are independently -O-, -S-, or -NR$^3$-; and R$^1$, R$^2$ and R$^3$ are independently hydrogen or hydrocarbon groups having 1 to 20 carbon atoms, said alternating copolymer consisting essentially of alternating sequences in which the olefin is bonded only to the acrylic ester or the α,β-ethylenically unsaturated dicarboxylic acid or its derivative, while the acrylic ester and the α,β-ethylenically unsaturated dicarboxylic acid or its derivative are bonded only to the olefin said alternating copolymer comprising about 50 mole percent olefin units, 0.1 to 49.9 mole percent acrylic ester units and 0.1 to 49.9 mole percent α,β-ethylenically unsaturated dicarboxylic acid or its derivative units and wherein the copolymer has an intrinsic viscosity of 0.1 to 10 dl/g as measured in toluene at 30°C.

2. An alternating copolymer according to Claim 1, wherein the olefin is selected from the group consisting of isobutylene and propylene.

3. An alternating copolymer according to Claim 1, wherein the acrylic ester is selected from the group consisting of alkyl acrylates, aryl acrylates, aralkyl acrylates, alkylaryl acrylates, cycloalkyl acrylates, cycloalkyl acrylates, alkenyl acrylates, aralkenyl acrylates, alkenylaryl acrylates, alkenyl acrylates, aralkenyl acrylates, alkenylaryl acrylates, cycloalkenyl acrylates and these acrylates in which the alcohol moiety is substituted by halogen, said acrylates having 1 to 20 carbon atoms in the alcohol moiety.

4. An alternating copolymer according to Claim 1, wherein the acrylic ester is selected from the group consisting of methyl acrylate, ethyl acrylate, propyl acrylate, n-butyl acrylate, t-butyl acrylate, n-amyl acrylate, n-hexyl acrylate, 2-ethylhexyl acrylate, octadecyl acrylate, o-tolyl acrylate, benzyl acrylate, cyclohexyl acrylate, 2-chloroethyl acrylate, vinyl acrylate, allyl acrylate, isobutenyl acrylate, 1'-butenyl acrylate, crotyl acrylate, 2'-butenyl acrylate, cinnamyl acrylate, 3'-cyclopentenyl acrylate, citronellyl acrylate, geranyl acrylate, 5'-norbornene-2'-yl-methyl acrylate and β-chloroallyl acrylate.

5. An alternating copolymer according to Claim 1, wherein the acrylic ester is selected from the group consisting of methyl acrylate, ethyl acrylate, and n-butyl acrylate.

6. An alternating copolymer according to claim 1, wherein the α,β-ethylenically unsaturated dicarboxylic acid or its derivative is selected from the group consisting of maleic acid, fumaric acid, maleic anhydride, maleimide, N-methylmaleimide, N-2-ethylhexylmaleimide, maleic monoamide, N-methylmaleic monoamide, N,N-dimethyl-maleic monoamide, maleic diamide, N,N'-dimethylmaleic diamide, monomethyl maleate, mono-n-butyl maleate, mono-2-ethylhexyl maleate, monomethyl thiolmaleate, dimethyl maleate, diethyl maleate, di-n-butyl maleate, di-2-ethylhexyl maleate, dioctadecyl maleate, dimethyl thiolmaleate, diethyl fumarate, and di-2-chloroethyl thiolfumarate.

7. An alternating copolymer according to Claim 1, wherein the α,β-ethylenically unsaturated dicarboxylic acid or its derivative is selected from the group consisting of maleic anhydride, and diethyl maleate.

8. An alternating copolymer according to Claim 1, wherein the copolymer contains further units derived from other ethylenically unsaturated compounds than the olefin and the acrylic ester selected from the group consisting of styrene and its homologs, diene compounds, unsaturated esters of carboxylic acids, unsaturated ethers, acrylonitrile, acrylic acid, acryloyl halides and acrylamides.

9. A process for producing an alternating copolymer as defined in claim 1 comprising copolymerizing at least one olefin selected from the group consisting of isobutylene, propylene, butene-1, 2-methylbutene-1, hexene-1, butene-2, 4-methylpentene-1, β-methallyl chloride, 2-methyl-4-chloropentene-1, 2-methyl-4-phenylbutene-1 and octadecene-1, at least one acrylic ester and at least one α,β-ethylenically unsaturated dicarboxylic acid or its derivative represented by the formula,

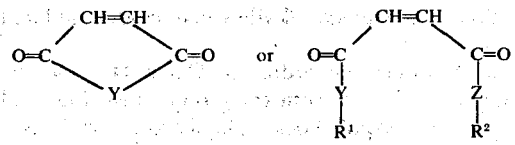

wherein Y and Z are independently -O-, -S-, or -NR³-, and R¹, R² and R³ are independently hydrogen or hydrocarbon groups having 1 to 20 carbon atoms, in the presence of a Lewis acid selected from the group consisting of halogen-containing compounds of aluminum, boron, zinc and tin as a complexing agent in an amount of 0.0005 to 10 moles per mole of the acrylic ester and the α,β-ethylenically unsaturated dicarboxylic acid or its derivative at a pressure of from normal pressure to 100 kg/cm² at a temperature of from —150°C to +120°C.

10. A process for producing an alternating copolymer as defined in claim 1 comprising copolymerizing at least one olefin selected from the group consisting of isobutylene, propylene, butene-1, 2-methylbutene-1, 2-methylpentene-1, hexene-1, butene-2, 4-methylpentene-1, β-methallyl chloride, 2-methyl-4-chloropentene-1, 2-methyl-4-phenylbutene-1, and octadecene-1, at least one acrylic ester and at least one α,β-ethylenically unsaturated dicarboxylic acid or its derivative represented by the formula,

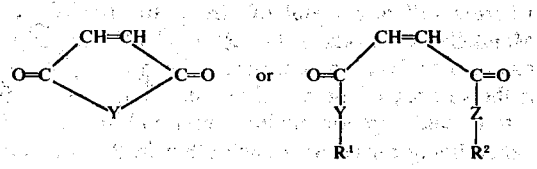

wherein Y and Z are independently —O—, —S—, —NR³—, and R¹, R² and R³ are independently hydrogen or hydrocarbon groups having 1 to 20 carbon atoms, with a catalyst consisting of at least one compound represented by the formula, $MR_nX_{3-n}$ wherein M is aluminum or boron, R is a hydrocarbon group having 1 to 20 carbon atoms, X is a halogen atom and n is any value greater than zero and smaller than 3, in an amount of 0.0005 to 10 moles per mole of the acrylic ester and the α,β-ethylenically unsaturated dicarboxylic acid or its derivative at a pressure of from normal pressure to 100 kg/cm² at a temperature of from —150°C to +120°C.

11. A process according to claim 10, wherein the polymerization is effected in bulk in the liquid monomers.

12. A process according to Claim 10, wherein the polymerization is effected in an inert solvent.

13. A process according to Claim 10, wherein the polymerization is effected in the presence of a radical initiator selected from the group consisting of oxygen, organic peroxides and azo compounds in an amount of 0.01 to 100 mole percent based on the catalyst.

14. A process according to Claim 10, wherein the polymerization is effected in the presence of a compound of transition metal of Group IVa, Va, VIa, VIIa or VIII of Mendeleev's Periodic Table in an amount of 0.001 to 10 moles per mole of the catalyst.

15. A process according to Claim 10, wherein the catalyst is selected from the group consisting to alkylaluminum dihalides, alkylaluminum sesquihalides, dialkylaluminum halides, alkylboron dihalides, and dialkylboron halides.

16. A process according to Claim 10, wherein the catalyst is selected from the group consisting of alkylaluminum sesquihalides, alkylboron dihalides and dialkylboron halides.

17. A process according to Claim 9, wherein the catalyst is ethylaluminum sesquichloride, an equimolar mixture of diethylboron chloride and ethylboron dichloride, or ethylboron dichloride.

18. A process for producing an alternating copolymer as defined in claim 1 comprising polymerizing at least one olefin selected from the group consisting of isobutylene, propylene, butene-1, 2-methylbutene-1, 2-methylpentene-1, hexene-1, butene-2, 4-methylpentene-1, β-methallyl chloride, 2-methyl-4-chloropentene-1, 2-methyl-4-phenylbutene-1, and octadecene-1, at least one acrylic ester and at least one α,β-ethylenically unsaturated dicarboxylic acid or its derivative with a catalyst system consisting of an organometallic compound represented by the formula:

$$M'R'_l X'_{p-l}$$

wherein M' is a metal of Group IIb, IIIb or IVb of Mendeleev's Periodic Table, R' is a hydrocarbon group having 1 to 20 carbon atoms, C' is a halogen atom, p is the valency of the metal and $l$ is any value of from 1 to p, and a metal halide represented by the formula:

$$M''X''_m R''_{q-m}$$

wherein m'' is a metal of Group IIb, IIIb or IVb of Mendellev's Periodic Table, R'' is a hydrocarbon group having 1 to 20 carbon atoms, X'' is a halogen atom, q is the valency of the metal and m is any value of from 1 to q, said organometallic compound and said metal halide being mixed with each other in the presence of the acrylic ester, or the α,β-ethylenically unsaturated dicarboxylic acid or its derivative, or both of them.

19. A process according to Claim 18, wherein the organometallic compound and the metal halide are selected from the group consisting of diethylzinc, triethylboron, tributylboron, triethylaluminum, tributylaluminum, trihexylaluminum, tetraethyltin, tetraphenyltin, ethyllead chloride, diethylboron chloride, ethylaluminum dichloride, ethylaluminum sesquichloride, triethyltin chloride, ethyltin trichloride, zinc chloride, boron trichloride, boron trifluoride, aluminum chloride, aluminum bromide and tin tetrachloride.

20. A process according to Claim 18, wherein the catalyst consists of triethylboron and boron trichloride in equimolar amounts.

21. An alternating copolymer having functional groups obtained by copolymerizing at least one monoolefin having at least 3 carbon atoms at least one acrylic ester and at lest one α,β-ethylenically unsaturated dicarboxylic acid or its derivative represented by the formula:

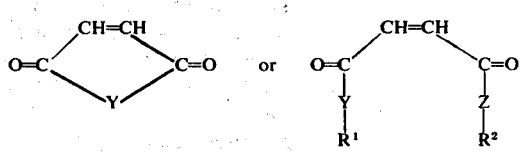

wherein Y and Z are independently -O-, -S-, or -NR³-; and R¹, R² and R³ are independently hydrogen or hydrocarbon groups having 1 to 20 carbon atoms, said alternating copolymer consisting essentially of alternating sequences in which the mono-olefin is bonded only to the acrylic ester of the α,β-ethylenically unsaturated dicarboxylic acid or its derivative, while the acrylic ester and the α,β-ethylenically unsaturated dicarboxylic acid or its derivative are bonded only to the mono-olefin, said alternating copolymer comprising about 50 mole percent olefin units, 0.1 to 49.9 mole percent acrylic ester units and 0.1 to 49.9 mole percent α,β-ethylenically unsaturated dicarboxylic acid or its derivative units and wherein the copolymer has an intrinsic viscosity of 0.1 to 10 dl/9 as measured in toluene at 30°C.

* * * * *